United States Patent Office 2,776,563
Patented Jan. 8, 1957

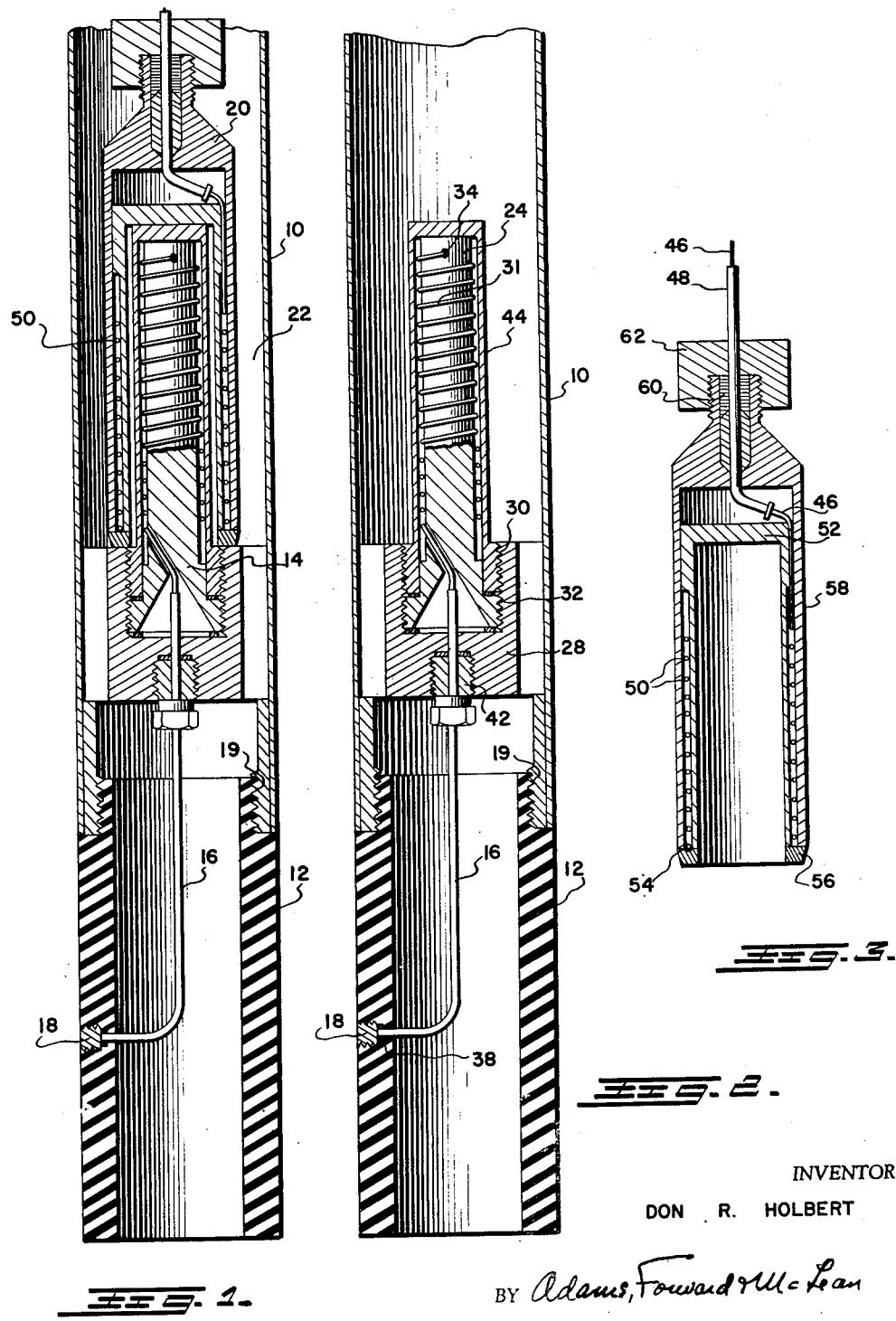

2,776,563

APPARATUS FOR USE IN LOCATING INTERFACE OF LIQUIDS

Don R. Holbert, Nowata, Okla., assignor to Sinclair Oil & Gas Company, Tulsa, Okla., a corporation of Maine Application July 18, 1955, Serial No. 522,705

2 Claims. (Cl. 73—151)

This invention relates to apparatus adapted for use in subterranean passages such as oil wells, water wells and the like. In particular, the present invention relates to an apparatus adapted to provide continuity of an electrical circuit extending from the earth's surface through the inside of a tubing string a distance down a bore hole, through the wall of the tubing and thence outside the tubing string to the surface of the earth so that electrical measurements can be made in the bore hole.

Certain operations in the production of fluids such as oil from subterranean passages involve passing a plurality of fluids having different characteristics into the well bore. Instances of such operations include processes known as injection profiling and selective acidization. Essentially, these processes involve basically similar manipulative steps and the apparatus employed can be substantially identical in each case. In general in such processes, two fluids are passed into the well bore in a manner such that an interface forms between the fluids. For adequate control of the process being effected it is essential that the location of such an interface be known. For example, in the event that injection rate is being determined, since fluid passing into the formation cannot be measured directly, a differential measurement can be obtained by measuring the quantities and/or flow rates of fluids introduced which are necessary to maintain the interface at a given point.

Apparatus for effecting these processes is known and is evidenced in the patent art, for example, by the Barstow Patent No. 2,347,589 and the Silverman Patent No. 2,524,933. The present invention in particular relates to an apparatus adapted to indicate in an advantageous manner an interface in a well bore, especially where profiling or acidization is being practiced.

I have now devised an apparatus especially adapted for determining the location of or following the movement of an interface in a well bore at a distance removed from the earth's surface. I have also devised a magnetic coupling device adapted for downhole electrical measurements. My device is characterized by the ability to evidence at the earth's surface, a downhole electrical coupling and is further characterized in that the electrical circuit coupling effected can be mechanically established or removed readily. The device is further advantageous in that it is easily assembled and disassembled and the entire apparatus need not be handled at one time or on one line.

The apparatus of my invention comprises a tubular member composed of an upper electrically conducting portion and a lower electrically non-conducting portion and which is provided with a first insulated electrical conductor coiled at one end fixedly mounted therein. A second insulated electrical conductor is provided and the characteristics of the coiled portion of each of the conductors are such that one can removably surround the other; in other words, the coils are adapted to mate. A magnetic core is disposed within one of the coils and the conductor is grounded to the core through the end of the coil, as by soldering. In the preferred embodiment, the coil provided with the core is that coil which is fixedly mounted within the tubing section, though the invention contemplates having the coil with the core as the moving coil. In either event, one end of the supported coil is in electrical communication with the electrically conducting portion of the tubular member, as through a suitable mounting means, and the other end of the coil electrically communicates with a conducting material externally positioned on a portion of the non-conducting section of the tubular member. By use of suitable leads extending from the ends of the first coil, current can be introduced into the entire unit as will be explained more fully below. The physical characteristics of the various parts of the unit are adapted so that fluids can flow in the tubing. Thus the coils are elongated members having diameters which are substantially less than the diameter of the tubing string within which they are employed. The supporting structure for the coil units advantageously comprises a star or cross-bar construction so that a continuous cross-sectional area is not encountered by fluids within the tubing.

The invention will be described further in conjunction with the appended drawing in which:

Figure 1 represents an embodiment of the apparatus partly in section and with parts cut away; and Figure 2 comprises a tubing section with the lower coil of the unit mounted therein; and Figure 3 is an embodiment showing the upper coil of the apparatus partly in section and partly in elevation.

Referring now to Figure 1, the numeral 10 represents a tubing section provided with a portion 12 composed of a non-conducting material. If desired, the tubing section can be composed of two portions threadedly engaged as at 19. Mounted within tubing section 10 is a unit 14, hereinafter identified as lower cell 14, having an insulated conductor 16 extending downwardly and terminating at an electrode 18. Removably mounted on cell 14 is a second unit 20, hereinafter referred to as upper cell 20. The mounting of cell 14 and the size of cell 20 are adapted to provide an annular space 22 about the units within the tubing section so that fluids can freely pass through.

Referring in particular to Figure 2 showing the lower cell 14 disposed within tubing section 10, the lower cell 14 is composed of an insulated electrical conductor 16 communicating at one of its ends with electrode 18 and disposed in the form of a coil 31 at its other end. The electrode 18 is a portion of electrical conducting material disposed on or imbedded in the surface of the insulated portion 12 of tubing section 10 in a manner such that it does not communicate with fluids within the tubing section. At the point of juncture of conductor 16 and electrode 18 a fluid sealing means 38 advantageously is employed.

Disposed within coil 31 is a core 24 preferably composed of soft iron or other material normally employed as a core of an electro-magnet. The coil 31 is grounded to core 24 preferably by a soldered connection 34. A means 28 is provided to support and mount the coil 31 and core 24 within tubing section 10. Advantageously, means 28 can take the form, in cross-section, of a spider or star arrangement so that fluid can freely pass through the tubing while the unit is in place. The mounting of the core 24 and coil 31 is facilitated by providing mating threaded surfaces 30 and 32 on the core 24 and mounting means 28. A locking and sealing means 42 can be provided in means 28 to facilitate passage of insulated conductor 16 through the mounting means 28 and prevent passage of fluids. Advantageously a sleeve 44 is disposed about the coil and core for purposes of protection; sleeve 44 is composed of non-magnetic materials.

Referring now to Figure 3 showing the upper cell 20 alone, this unit is composed of an insulated electrical conductor 46 advantageously contained within a cable 48 and disposed at the other end in the form of a coil 50. The coil 50 is disposed about a non-magnetic generally cylindrical sleeve 52. Surrounding coil 50 is a second generally cylindrical sleeve 58 composed of electrical conducting material, i. e. iron. The lower end of coil 50 is ground to sleeve 58 as by a soldered connection 54. A seating ring 56 of a magnetic material is disposed about the lower end of the unit to facilitate continuity of the magnetic circuit. To provide support for the entire upper cell 20, the upper portion of sleeve 58 is provided with a packing gland 60 through which the cable 48 passes and the cable 48 advantageously is integrally associated with a threaded metal block 62 into which a mated thread on sleeve 58 may be screwed.

While the device has been described in the embodiment having the upper coil surround the lower coil, if desired the coils can be adapted to have the upper coil fit within the lower coil. In this embodiment, the upper coil is provided with the core of magnetic material rather than as just described.

In operation, a tubing section such as 10 having a lower cell 14 mounted therein is connected in a tubing string which is electrically grounded and is lowered into a well bore, such as one undergoing injection profiling. Salt water, for example, is pumped through the inside of the tubing string, passes out its bottom, filling the well bore to a point about the tubing string in the annular area defined by the tubing string and the adjacent well bore. Fresh water passed into the well bore at the earth's surface, in the annular space between the well bore and tubing string, contacts the brine and an interface forms between the two fluids opposite an exposed portion of the well bore.

At the earth's surface, a suitable source of alternating current provided with a voltage controlling means is connected to the conductor 46 of upper cell 20 with the other terminal of the source being grounded. An ammeter or other current indicating device is provided in the circuit between the source and conductor. The unit is then lowered through the tubing string and into contact with the lower cell 14. Current thus passes through the circuit comprising the source, conductor 46, through coil 50, to seating ring 56, through the mounting means 28 to tubing 10 and thus to ground, the other terminal of the source.

Alternating current is employed and by virtue of the continually changing current a series of flux lines occurs about the core 50. Thus, when cell 20 having an alternating current passing therethrough comes into the general area of cell 14, and preferably surrounding cell 14, flux lines are cut by coil 31 whereby a current is induced in coil 31 and core 24 is magnetized. The current induced in coil 31 flows in the circuit including coil 31 through the ground 34 to core 24, from core 24 to mounting means 28 and then to tubing 10 which is grounded. The remaining portion of the circuit is composed of conductor 16 extended from coil 31 and thence to electrode 18 which communicates with the fluid in the annular space between the tubing string and the well bore. The fluid constitutes the electrical connection between electrode 18 and the electrically conducting portion of tubing 10 whereby the lower circuit is completed. Accordingly, the characteristics of the circuit of lower cell 14 are effected by the electrical characteristics of the fluid. For example, when the entire gap between electrode 18 and tubing string 10 is filled by brine a certain current can flow in the circuit; when, however, the interface occurs between these two points and the fluid constituting the electrical connection between the electrode and the conducting tubing is composed of both brine and fresh water or fresh water alone a different current will flow in the circuit since the resistance of the circuit has been changed.

The current flow in the lower cell 14 is, of course, an alternating current and as it passes through coil 31 the resulting flux lines induces what may be considered as a back current in coil 50. It can be seen, therefore, that by maintaining the voltage on the upper circuit constant, any changes observed in the reading on the ammeter in the upper circuit will be the result of current changes in the lower circuit which, in turn, are the result of changes in the interface which change the electrical characteristics of the lower circuit. By suitable calibration of the lower circuit prior to placing it in the well bore, the relative position of the interface with respect to the electrode or any other reference point between the electrode and the coil units can be ascertained. By this procedure relative movement of the interface and its location at any given instant may be readily determined by comparing the ammeter reading with the calibration data. By correlation of input rates of the fluids necessary to maintain the interface at a given point, the injection rate of the strata involved is determined.

What is claimed is:

1. Apparatus of the type described comprising a tubular member having a lower portion composed of electrically non-conducting material and an upper portion composed of electrically conducting material, a first insulated electrical conductor coiled at one end, a magnetic core within the coiled portion of said first conductor, a second insulated electrical conductor coiled at one end and adapted to removably surround said first coil, one of said coils being fixedly mounted in said tubing in a manner permitting mating with said other coil, an electrode disposed on the surface of the non-conducting portion of said tubular member, an end of said mounted coil electrically communicating with the upper portion of said tubing and the other end of said mounted coil electrically communicating with said electrode, the physical characteristics of said coils and tubular member being adapted to permit flow of fluids between said coils and tubular member.

2. Apparatus of the type described comprising an elongated tubular member having a lower portion composed of electrically non-conducting material and an upper portion composed of electrically conducting material, a first insulated electrical conductor coiled at one end and centrally disposed in said tubular member, a magnetic core within the coiled portion of said electrical conductor, electrically conducting supporting means in said tubular member to support and space said coil and core, said supporting means being in electrical communication with the conducting portion of said tubular member, said coiled electrical conductor being grounded at one end to said core and communicating at its other end with an electrode associated with the surface of the portion of said tubular member composed of non-conducting material, a second insulated electrical conductor coiled at one end in a form such that it is adapted to removably surround said first coiled conductor, a metallic sheath disposed about the coiled portion of said second electrical conductor and in electrical contact with said supporting means, said second conductor being grounded at one end to said sheath, the physical characteristics of said coils, sheath, electrical conducting supporting means and tubular member being adapted to permit flow of fluid between said sheath and tubular member.

References Cited in the file of this patent
UNITED STATES PATENTS

| | | |
|---|---|---|
| 2,347,615 | Shelly | Apr. 15, 1944 |
| 2,381,875 | Bryant | Aug. 14, 1945 |